2,830,026

PROCESS FOR PRODUCING BORON-METAL OXIDE CATALYST

Isadore Shapiro, Pasadena, Calif.

No Drawing. Application January 29, 1954
Serial No. 407,148

11 Claims. (Cl. 252—432)

The invention disclosed in this application for Letters Patent is subject to a non-exclusive, irrevocable, royalty-free license to the Government of the United States of America with power to grant licenses for all governmental purposes.

My invention relates to modified oxides and to a process for producing such modified oxides. More particularly, my invention relates to the modification with diborane ($B_2H_6$) of oxides of the gel type containing adsorbed water and to such modified products.

In the presence of free water, diborane hydrolyzes to give hydrogen and a boric acid, whose degree of hydration depends upon the relative ratio of water to diborane. This hydrolysis of diborane may be illustrated by the following three equations:

(1) $B_2H_6 + 6H_2O \rightarrow 2H_3BO_3 + 6H_2$
(2) $B_2H_6 + 4H_2O \rightarrow 2HBO_2 + 6H_2$
(3) $B_2H_6 + 3H_2O \rightarrow B_2O_3 + 6H_2$ I have found that the adsorbed water of oxides of the gel type, for example, silica gel, will enter into a hydrolysis reaction with diborane in the manner indicated above and that this reaction provides an advantageous means for introducing boron to the gels to form modified products. When an oxide of the gel type, such as silica gel, containing adsorbed water is contacted with diborane in accordance with my process, adsorbed water reacts with the diborane to form a boric acid within the gel mass. As the result of this hydrolysis reaction, modified oxides or gels are formed which contain a boric acid in intimate admixture with the gel particles and as a deposit on the surfaces of the gel particles.

My copending application Serial No. 407,147, filed January 29, 1954, is directed to surface modified oxides of the gel type and a process for producing such surface modified products which involves contacting a gel containing only bound water with diborane. That application is based on my discovery that the bound water of gels such as silica gel will react with diborane to produce surface modified products. The bound water of these gels, unlike the adsorbed water, is chemically combined water and constitutes an integral part of the gel framework. In the process of application Serial No. 407,147, the adsorbed water is removed from the gel by a suitable treatment, for example, by heating, by evacuating, or by desiccating with a suitable desiccant such as $P_2O_5$, before the gel is contacted with diborane. The bound water left in the gel after this treatment to remove adsorbed water is present in the gel in the form of hydroxyl ions, the bulk of which are located in the surface of the gel, and these hydroxyl ions serve to partially hydrolyze borine ($BH_3$) formed by the dissociation of diborane when diborane is brought into contact with the gel. New gel products containing chemically bound boron in the form of partially hydrolyzed borine are produced as the result of this hydrolysis reaction by which hydrogen atoms of hydroxyl groups of the original gel structure are replaced by —$BH_2$ radicals. The hydrolysis of the borine (—$BH_2$ radicals) can be carried further and even completed by subsequent treatment as by heating or exposing to water vapor the partially hydrolyzed material to convert at least a portion of the —$BH_2$ radicals to —$B(OH)_2$ radicals. The surface modified products can be further modified by heating to a temperature of the order of 500 to 1000° C. to effect dehydration by the removal of hydrogen atoms and hydroxyl radicals of the modified gel structure as water. The new compositions of matter of my application Serial No. 407,147 are surface modified oxides of the gel type wherein hydrogen atoms of the hydroxyl groups of the original gel structure have been replaced by —$BX_2$ radicals in which X is selected from the group consisting of hydrogen atoms and hydroxyl radicals and dehydrated surface modified oxides of the gel type wherein hydrogen atoms and hydroxyl radicals of the above-described modified gel structure have been removed as water.

The invention of my present application expressed in terms of my new process for producing modified oxides of the gel type comprises contacting a gel containing adsorbed water with diborane. In accordance with this new process, gels containing adsorbed water can be contacted with diborane in an amount and under conditions such that the diborane reacts with only a minor portion of the water present in the gel both as adsorbed water and as bound water, or diborane can be employed in an amount sufficient and under conditions such that it reacts with a major portion of the water present in the gel both as adsorbed water and as bound water to form a boric acid and to replace hydrogen atoms of hydroxyl groups of the original gel structure by —$B(OH)_2$ radicals. In preparing these new products, prior to exposure to diborane the gels can be subjected to heating or other treatment to control the amount of water present for reaction with the diborane and thus to control the amount of boron which will be introduced into the gels by the hydrolysis reactions when carried to completion. In addition, the diborane modified products can be subjected to heating at a temperature from about 100° C. to about 1000° C. to effect a further modification of the products by dehydration which, depending upon the particular temperature and time of heating employed, will be either by the removal of water only from the boric acid formed by the reaction between the adsorbed water and the diborane or by the removal of water both from this boric acid and from the modified gel structure resulting from the hydrolysis reaction involving diborane and the bound water of the gel. Temperatures of about 100° C. and somewhat above will effect a dehydration only of the boric acid. Temperatures in approximately the upper half of the above range will effect a dehydration of the boric acid and will also effect a dehydration of the modified gel structure by removing hydrogen atoms and hydroxyl radicals of the modified gel structure as water.

The new compositions of matter produced by my new process are modified oxides of the gel type comprising in admixture a boric acid, including boric anhydride or oxide, and an oxide of the gel type, including surface modified oxides of the gel type wherein hydrogen atoms of the hydroxyl groups of the original gel structure have been replaced by —$B(OH)_2$ radicals and dehydrated surface modified oxides of the gel type wherein hydrogen atoms and hydroxyl groups of the above-described modified gel structure have been removed as water.

The modified oxides of my present invention can be prepared from any of many various gel materials which contain adsorbed water and such gels also contain chemically combined or bound water which exists in the form of hydroxyl ions the majority of which are present in the surface of the gel material. Synthetic silica, alumina and magnesia gels, or gels prepared from any combination of these, for example, silica-alumina, alumina-magnesia or silica-alumina-magnesia gels, as well as natural clays, can be modified in accordance with my process to produce my new products. The modified oxides or gels of my invention have a great variety of uses. For example, they may be used as adsorbents for gases, liquids and solids from various mixtures, and they may be used with particular advantage as catalysts and/or catalyst carriers, for example, in the treatment and synthesis of petroleum and hydrocarbon materials. They may be employed as adsorbents and as catalysts and/or catalyst carriers in the many ways that the unmodified gels are used. The wide use of many types of synthetic gels as catalysts and/or catalyst carriers in the oil industry presents a large field of use for my modified oxides or gels.

My process for producing my modified oxides is particularly advantageous and my modified oxides are particularly desirable because, whether by the reaction between diborane and adsorbed water or by the reaction between diborane and bound water, the boron is placed just on the surface of the treated gel which is the only catalytically effective part of the gel.

It has been established that varying the grain size of a particular gel does not alter the specific surface, porosity, or water content of the gel. Therefore, my process is applicable to gels in whatever particle size they may be used. The actual amount of adsorbed water and bound water in a particular gel will depend on the method of preparation of the original gel plus any preliminary treatment of the gel prior to the exposure of the gel to diborane.

It is possible to regulate the amount of water present in the gel to be modified by treatment with diborane. Adsorbed water can be removed to decrease the adsorbed water content of the gel by subjecting the gel to any suitable treatment, such as, by heating, by evacuating, by desiccating with $P_2O_5$, or by a suitable combination of these separate treatments. Temperatures up to 100 to 150° C. may be employed to reduce the adsorbed water content of a gel although ordinarily temperatures below 100° C. are sufficient to effect a removal of a portion of the adsorbed water. Temperatures in excess of 150° C. will result in the removal of some of the bound water of the gels. Heating times vary over a wide range depending on the temperature employed and the amount of adsorbed water to be removed but should be less than about 10–15 minutes at temperatures of 100° to 150° C. so that all the adsorbed water is not driven off. By suitably regulating the conditions by which water removal is effected, the water content of the gel to be treated with diborane can be set at a desired value. This is one manner by which the ultimate content of boron in the final product can be controlled.

After preliminary treatment to adjust the water content of the gel, the gel containing adsorbed water is exposed to diborane gas. It should be noted by way of precaution that since diborane is highly reactive with air or water, all handling of diborane should be carried out in high vacuum apparatus or at least under conditions excluding both air and free water vapor. When the treatment is carried out under high vacuum conditions, the gel should be cooled to a low temperature, for example, by a Dry Ice bath (—80° C.), to prevent the loss of adsorbed water which otherwise would be withdrawn from the gel on evacuation of the air. If the gel is exposed to diborane under conditions not involving subatmospheric pressures, higher temperatures up to 50° C. and above can be used.

The time of exposure of the gel to diborane to obtain the new products of my invention varies from a short time of considerably less than one hour to several hours or more depending upon the ratio of diborane to gel employed, the desired extent of the hydrolysis reaction, the manner of contacting the gel and the diborane, and the temperature at which contacting is effected. For example, if the diborane is employed in excess with respect to the water content of the gel and contacting is effected at room temperature with circulation of the gas through the mass of gel particles, the rate of hydrolysis is comparatively rapid. However, if the water content of the gel is in excess with respect to the amount of diborane employed and contacting is effected without circulation of the gas through the mass of gel particles under high vacuum conditions with the mass of gel particles cooled, as by a Dry Ice bath (minus 80° C.), to prevent loss of adsorbed water of the gel during evacuation, the rate of hydrolysis is comparatively slow.

The diborane reacts with the adsorbed water of the gel to form a boric acid in the manner illustrated in Equations 1, 2 and 3. As shown by those three illustrative equations, regardless of the boric acid end product obtained, the ratio of hydrogen evolved to diborane consumed is 6:1.

The hydroxyl groups of the bound water of the gel partially hydrolyze the borine ($BH_3$) formed by the dissociation of diborane. This partial hydrolysis between bound water hydroxyl groups and diborane results in a ratio of hydrogen evolved to diborane consumed of about 2:1 or somewhat more. The hydrolysis of the partially hydrolyzed borine groups ($BH_2$) is probably completed almost immediately by the adsorbed water present to evolve further hydrogen to bring the ratio of total hydrogen evolved to diborane consumed to 6:1. These hydrolysis reactions, described generally in my application Serial No. 407,147, may be illustrated as follows:

The reaction of silica containing only bound water with diborane is as follows:

(4)
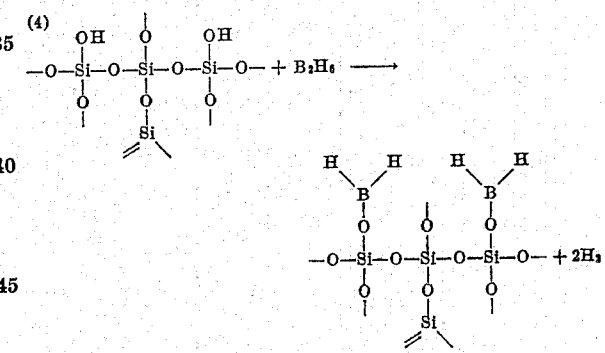

The reaction of the partially hydrolyzed borine ions with water is as follows:

(5)
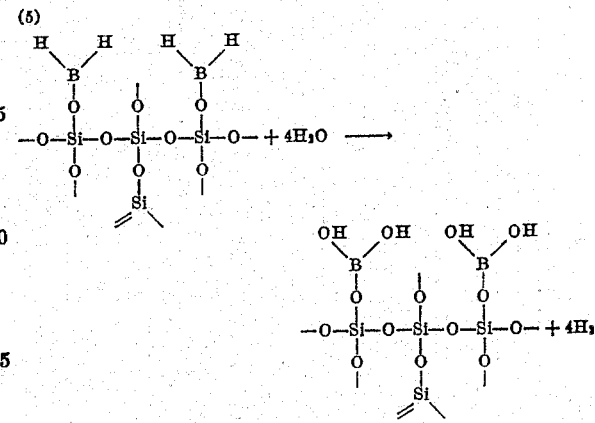

It is not necessary to add free water vapor to supply the water in Equation 5 above. This water is supplied by the adsorbed water present in the gel. This is indicated by the following examples:

*Example I*

When diborane was exposed at —80° C. to a silica gel containing adsorbed water the ratio of hydrogen evolved to diborane consumed was found to be 4:1. This is the same ratio as that obtained from the exposure of diborane to ice at −80° C. Upon increasing the temperature of the exposed silica gel to −23° C. or above, additional hydrogen came off to raise the ratio to 6:1, the value representing complete hydrolysis of the diborane.

*Example II*

At room temperature, the exposure of diborane to a silica gel containing adsorbed water resulted immediately in the evolution of hydrogen in a ratio of 6:1 on the diborane consumed.

The ratio of 6:1 hydrogen evolved to diborane consumed which was achieved in both Example I and Example II would not have been possible if any significant amount of borine groups remained in the partially hydrolyzed form after reaction with bound water hydroxyl groups of the gel. Therefore, the hydrolysis of any partially hydrolyzed borine groups resulting from the reaction between bound water hydroxyls and diborane must be completed by the adsorbed water of the gel.

The following example will further illustrate my invention.

*Example III*

Approximately ½ gram of silica containing approximate 20% water (about 15% adsorbed water and 5% bound water) was placed in a glass vessel, cooled with a Dry Ice bath (−80° C.), and then the air in the vessel evacuated. The low temperature bath prevented the loss of water which otherwise would have been removed on evacuation of the air. Then with the −80° C. bath still in place $9.27 \times 10^{-4}$ gram moles of diborane was introduced into the reactor. After about an hour's time all the gases were pumped out, and it was found that $6.54 \times 10^{-4}$ gram moles of diborane were recovered, along with $1.19 \times 10^{-3}$ gram moles of hydrogen formed. After allowing the silica to warm to room temperature, some additional hydrogen in the amount of $3.57 \times 10^{-4}$ gram moles was evolved to give a total of $1.55 \times 10^{-3}$ gram moles. Since the difference between the amount of diborane originally introduced into the reactor and the amount of diborane recovered is $2.73 \times 10^{-4}$ gram moles of diborane, the overall ratio of hydrogen to diborane is 5.7:1. Because of the small amounts of materials involved, this ratio was considered in good agreement with 6:1, the value representing complete hydrolysis of the diborane.

The one hour exposure time of the diborane to the silica containing adsorbed water is not of any great significance since in this experiment there was no circulation of gases and hence the rate of hydrolysis of the diborane was comparatively slow. Only a part of the water content of the silica was reacted with diborane under the particular conditions of contacting employed. A greater part of the water content could have been reacted by using a longer contact time, by the circulation of the gas through the mass of silica particles, or by employing higher temperatures particularly when high vacuum conditions are not employed.

If, after exposure to diborane whether to react all of the water content or only part of the water content, a diborane modified gel initially containing adsorbed water is heated to a temperature in the range of about 100° to about 1000° C. or above, e. g., the upper portion of this temperature range corresponding to the temperatures customarily employed in calcining gels, the diborane modified gels of my invention will be further modified to a dehydrated form by the removal of water. Depending upon the temperature and the time of heating employed, a dehydration will be effected either of the boric acid formed from the adsorbed water and the diborane or of both this boric acid and the modified gel structure resulting from the hydrolysis reaction between diborane and the bound water hydroxyls of the gel.

Orthoboric acid ($H_3BO_3$) gradually loses water when heated to a temperature about 100° C. and changes to metaboric acid ($HBO_2$). At a temperature of about 140° C. further water is lost to result in tetraboric acid ($H_2B_4O_7$). If heating is continued at this latter temperature all the water will be removed to form boric anhydride or oxide ($B_2O_3$).

No substantial dehydration of the modified gel structure will be effected at the above minimum temperatures necessary to dehydrate the boric acid. However, at temperatures in approximately the upper half of the above range, a dehydration of both the boric acid and of the modified gel structure will be effected by the removal of hydrogen atoms and hydroxyl groups of the modified gel structure as water. Of course, heating in the temperature range of 100° to 1000° C. for any extended period will remove any unreacted adsorbed water from a diborane modified gel.

For example, the product of Example III can be heated to a temperature within the range of about 100° to 1000° C. and maintained at this temperature for about ½ hour to effect dehydration. At temperatures within the lower portion of the range, unreacted adsorbed water would be removed and the boric acid would be dehydrated. At temperatures in the upper portion of this range, the unreacted adsorbed water would be removed, the boric acid would be dehydrated to boric oxide, and hydrogen atoms and hydroxyl groups of the modified gel structure would be removed as water. Heating time will, of course, vary considerably depending on the extent of dehydration sought.

Under conditions effecting a dehydration of the modified gel structure, some of the boron of the borine groups may assume the form of boron oxide in which the boron atom remains attached to the oxygen of the gel, e. g., $O=B-O-Si\equiv$. Cross-linking may develop both between molecules and within molecules of the gel by the occurrence of boron to oxygen to boron linkages and boron to oxygen to silicon linkages occasioned by the ways in which the formation of a particular molecule of water might be effected. In addition, heating at these relatively high temperatures may cause some of the borine groups to be split away from the molecule of the gel to form free boric oxide. Other modifications of the diborane modified gel may occur when the gel is heated to such a relatively high temperature to effect dehydration.

While I have described my new process and the new products resulting from that process without reference to many of the possible prior or subsequent modifications of the gels either by physical treatment or by treatment with other materials, it will be understood from my disclosure that my invention involves the reaction between diborane and the water of a gel containing adsorbed water. Therefore, modification according to my process may be followed by a further modification of the products of my process by physical treatment or by treatment with other materials, or the gels may be first modified in some other way which does not affect the adsorbed water content of the gels or at least does not effect a complete removal of such adsorbed water so that such modification of the gels may be followed by a treatment with diborane in accordance with my process.

I claim:

1. The process for producing modified oxides of the class consisting of at least one of silica, alumina, and magnesia gel which comprises contacting a gel containing adsorbed water with gaseous diborane in an amount and for a time sufficient to form a boric acid and to replace hydrogen atoms of hydroxyl groups of the original gel structure by $-B(OH)_2$ radicals.

2. The process for producing modified oxides of the class consisting of at least one of silica, alumina, and magnesia gel which comprises contacting a gel containing adsorbed water with gaseous diborane in an amount and for a time sufficient to form a boric acid and to replace hydrogen atoms of hydroxyl groups of the original gel structure by —B(OH)$_2$ radicals and heating the modified oxide to a temperature of the order of about 100 to about 1000° C. to effect dehydration.

3. The process for producing modified oxides of the class consisting of at least one of silica, alumina, and magnesia gel which comprises contacting a gel containing adsorbed water with gaseous diborane in an amount and for a time sufficient that the diborane reacts with a major portion of the water present in the gel both as adsorbed water and as bound water to form a boric acid and to replace hydrogen atoms of hydroxyl groups of the original gel structure by —B(OH)$_2$ radicals.

4. The process for producing modified oxides of the class consisting of at least one of silica, alumina, and magnesia gel which comprises contacting a gel containing adsorbed water with gaseous diborane in an amount and for a time sufficient that the diborane reacts with a major portion of the water present in the gel both as adsorbed water and as bound water to form a boric acid and to replace hydrogen atoms of hydroxyl groups of the original gel structure by —B(OH)$_2$ radicals, and heating the modified oxide to a temperature of the order of about 100 to about 1000° C. to effect dehydration.

5. The process for producing modified silica gel which comprises contacting a silica gel containing adsorbed water with gaseous diborane in an amount and for a time sufficient to form a boric acid and to replace hydrogen atoms of hydroxyl groups of the original gel structure by —B(OH)$_2$ radicals.

6. The process for producing modified silica gel which comprises contacting silica gel containing adsorbed water with gaseous diborane in an amount and for a time sufficient to form a boric acid and to replace hydrogen atoms of hydroxyl groups of the original gel structure by —B(OH)$_2$ radicals and heating the modified silica gel to a temperature of the order of about 100 to about 1000° C. to effect dehydration.

7. The process for producing modified silica gel which comprises contacting a silica gel containing adsorbed water with gaseous diborane in an amount and for a time sufficient that the diborane reacts with a major portion of the water present in the gel both as adsorbed water and as bound water to form a boric acid and to replace hydrogen atoms of hydroxyl groups of the original gel structure by —B(OH)$_2$ radicals.

8. The process for producing modified silica gel which comprises contacting a silica gel containing adsorbed water with gaseous diborane in an amount and for a time sufficient that the diborane reacts with a major portion of the water present in the gel both as adsorbed water and as bound water to form a boric acid to replace hydrogen atoms of hydroxyl groups of the original gel structure by —B(OH)$_2$ radicals, and heating the modified silica gel to a temperature of the order of about 100 to about 1000° C. to effect dehydration.

9. The product produced by the process of claim 1.
10. The product produced by the process of claim 2.
11. The product produced by the process of claim 5.

References Cited in the file of this patent

UNITED STATES PATENTS

| | | |
|---|---|---|
| 2,504,001 | Connolly | Apr. 11, 1950 |
| 2,584,405 | West | Feb. 5, 1952 |
| 2,731,453 | Field et al. | Jan. 17, 1956 |

OTHER REFERENCES

Shapiro et al.: "Bound Water in Silica Gel," in "The Journal of Physical Chemistry," vol. 57, No. 2, February 1953, pages 219 to 221 incl.